United States Patent [19]
Gray

[11] Patent Number: 5,485,517
[45] Date of Patent: Jan. 16, 1996

[54] PORTABLE WIRELESS TELEPHONE HAVING SWIVEL CHASSIS

[76] Inventor: Robert R. Gray, 5225 Memorial Dr., Houston, Tex. 77007

[21] Appl. No.: 427,305

[22] Filed: Apr. 24, 1995

Related U.S. Application Data

[63] Continuation of Ser. No. 162,757, Dec. 7, 1993, abandoned.
[51] Int. Cl.⁶ .................................................. H04M 1/00
[52] U.S. Cl. ............................................ 379/433; 379/434
[58] Field of Search ...................................... 379/433, 434, 379/428, 61; 16/297, 331, 328, 321, 319, 329

[56] References Cited

U.S. PATENT DOCUMENTS 4,666,328  5/1987  Ryu .......................................... 16/329

FOREIGN PATENT DOCUMENTS

| 53-135959 | 8/1984 | Japan | 379/433 |
| 53-135960 | 8/1984 | Japan | 379/433 |
| 60-21636 | 2/1985 | Japan | 379/433 |
| 274046 | 11/1990 | Japan | 379/61 |

Primary Examiner—Jeffery A. Hofsass
Assistant Examiner—Jack Chiang
Attorney, Agent, or Firm—Bush, Moseley, Riddle & Jackson

[57] ABSTRACT

The invention is the construction of a portable telephone made short enough and flat enough to be conveniently carried upon the person, yet allowing it to be quickly reconfigured into a form that is long enough and contoured enough to be effective and natural to use. The telephone chassis includes a pair of chassis sections which are interconnected by a pivot connection about which the chassis sections are rotated between open or closed positions. The pivot connection defines a pivot axis and a plane of rotation which are oriented in angulated relation with both chassis sections so that the chassis sections define a compact configuration when closed and an ergonomic configuration when rotated to the open position. A manually releasable spring urged locking mechanism is provided to lock the chassis sections against relative rotation at both the open and closed positions. A torsion spring is provided to partially open or partially close the chassis sections upon manual unlocking thereof and to permit free rotation during predetermined relative pivotal movement of the chassis sections. A mechanism may also be provided for automatic extension and retraction of an antenna which is actuated by opening and closing movement of the telephone chassis sections.

21 Claims, 4 Drawing Sheets

PORTABLE WIRELESS TELEPHONE HAVING SWIVEL CHASSIS

This application is a continuation, of application Ser. No. 08/162,757 filed Dec. 7, 1993 now abandoned.

FIELD OF THE INVENTION

This invention relates generally to portable telephones that are usable in connection with wireless telephone communications. More particularly, the present invention concerns a portable telephone construction having a pivotally movable chassis section that cooperates to cover and protect the controls (normally a keypad) of a second chassis section of the telephone from contact and impact by other objects and from contamination by dust and other foreign matter. This invention also relates to wireless telephones which are uniquely constructed for transportation by pivotally collapsing to facilitate sliding into and from pockets of clothing, purses, brief cases, etc. and which provide an ergonomic configuration when open to facilitate efficient and comfortable use thereof.

BACKGROUND OF THE INVENTION

The terms "telephone" and "telephone handset" as used herein are intended to encompass complete telephone communications devices wherein all system components may be incorporated within the portable handset structure. In the cellular and cordless telephone industries relatively small telephones have been developed so as to enable them to be more easily transported on the person or in the transportation conveyance of the user. Examples of compact, folding telephones are represented by U.S. Pat. Nos. D-300,742 of Soren et al (Motorola); 4,897,873 of Beutler et al (Motorola); 5,027,394 of Ono et al (Matsushita-Panasonic) and 5,111,503 of Takagi (Fujitsu Ltd). A portable telephone provided with a fold-out, rod-like microphone boom is disclosed by U.S. Pat. No. 5,197,091 of Takagi et al, (Fujitsu Ltd.). In each case in order to render the telephones or telephone handsets to small and compact configuration for carrying in personal clothing pockets, handbags etc., the telephones are of jointed, folding construction. In use, a portion of the telephone is folded out typically for positioning the (apparent) microphone of the handset at a suitable distance from the earpiece. Thus, folding telephones are typically relatively short so that they can be more easily stored and transported, although folding telephones are typically quite bulky and are not easily carried in the pockets of clothing.

Significant advances are presently being made in battery technology for use in a wide variety of portable electronic devices such as wireless telephones, portable computers and so on. At the beginning of the wireless telephone industry adequate power supply batteries were quite large and thus the telephones for which they were designed were also quite bulky. Improved electronics efficiency and improved battery technology has allowed portable electronic equipment to become fairly small without any sacrifice from the standpoint of efficiency and effectiveness. In the future, power supply batteries for wireless telephone systems will be of significantly less dimension because of advances in those technologies and because the transmission power requirements of future wireless systems will be orders of magnitude less than present systems. Therefore the future promises handset construction dramatically smaller and more flexibly designed to be easily carried in the pockets of personal clothing. For this purpose, wireless telephones will of necessity be designed with smooth contours so as to readily slide into and from clothing pockets. The present invention is therefore generally directed to a portable telephone construction which is sufficiently small to be readily carried in a shirt pocket or inside suit pocket of the user's clothing and which is smoothly contoured for efficient sliding relation with the user's wearing apparel. Another important feature of wireless telephone systems for the future is an efficient design that will permit the telephone handset to "fit" the contour of the facial anatomy of the user and to have a comfortable "feel" during use. A necessary element of that "feel" is that when the handset is readied for use, that it present a comfortably, ergonomically configured chassis which comfortably fits the hand of the user and is also comfortably configured to naturally correspond to the facial anatomy of the user. Heretofore, the typical cellular portable handset construction has consisted of an inflexible chassis box with ear and mouthpieces being defined at each end of the chassis box and being separated by control and display mechanisms. Even the foldover type phones, sometimes called "flip-phones", are largely a variation of the same "brick-phone" theme, effectively comprising a short chassis box with a flap.

It is desirable to provide a wireless telephone having means for protecting the keypad and/or controls from inadvertent contact and impact with objects in its vicinity, and also protecting the controls of the telephone from contamination by dust and other debris that might be present in its immediate environment. It is desirable to provide a telephone construction that is readily and efficiently collapsible to a very small dimension that may be easily carried in the shirt pocket or suit pocket of a user, or in a handbag, brief case or other carrying device. It is also desirable to provide a collapsible portable telephone construction which, when fully opened, assumes a configuration that readily enables the speaker of the telephone chassis to be positioned at the ear of the user and enables the microphone thereof to be positioned in natural relation to the mouth of the user for optimum telephone communication. For this to occur it is desirable that the collapsible telephone chassis construction have the capability of being pivotally collapsed for storage and transportation and pivotally opened for use to position the earpiece and mouthpiece in properly oriented relation for optimized telephone communication.

In the future, nearly all telephones will be of the wireless variety and will be capable of transportation on the person or in the carry wear of the user. It is therefore desirable to provide a portable telephone device that is highly portable and constructed so as to facilitate efficient personal transportation and handling as well as being convenient to use.

SUMMARY OF THE INVENTION

It is therefore a principal feature of the present invention to provide a novel collapsible portable telephone construction having a two-component chassis structure with the chassis components being pivotally interconnected and pivotally movable to a compact, closed position for storage and transportation and to an open position for telephone communications.

It is also a feature of this invention to provide a novel collapsible portable telephone construction, which, in the open position thereof, is of ergonomic configuration, so as to comfortably fit the facial contour of the user so that the speaker and microphone of the opened portable telephone are properly positioned for effective telephone communications.

It is also a feature of this invention to provide a novel portable telephone construction having two elongate chassis sections which interfit in the closed position of the telephone chassis to define a compact, closed and substantially sealed portable telephone assembly that provides suitable protection for the operational components thereof while the telephone is being carried about the person of the user, such as in a pocket of the clothing, in a handbag, brief case, etc.

It is also a feature of this invention to provide a novel portable, collapsible telephone assembly having two interfitting and pivotally interconnected telephone chassis sections which include a locking mechanism permitting locking of the chassis sections at both the opened and closed positions thereof.

It is an even further feature of this invention to provide a portable telephone assembly having pivotally interconnected telephone chassis sections which, when closed, are spring urged toward the open position thereof, so that, when unlocked, the chassis sections will accomplish initial spring urged pivotal movement toward the open or extended positions thereof.

It is also a feature of this invention to provide a novel portable telephone assembly having pivotally interconnected chassis sections which, in the open position thereof, are spring urged toward the closed position thereof such that when unlocked, the chassis sections will accomplish initial spring urged pivotal movement toward the closed positions thereof.

It is also a feature of this invention to provide a novel portable, pivotally opening telephone chassis assembly having an antenna which is extended and retracted responsive to opening and closing movement of the chassis sections of the portable telephone assembly.

It is another feature of this invention to provide a novel pivotal telephone assembly having pivotally interconnected chassis sections, each of which contains components of the electronic circuitry and which chassis sections are provided respectively with a speaker and microphone for telephone communications.

It is an even further feature of this invention to provide a novel, pivotally interconnected portable telephone assembly having electronic circuitry with portions thereof being electrically switched on pivotal movement of telephone chassis sections from the compact, closed position thereof, to the open position thereof or from the closed position to the open position thereof.

It is another feature of this invention to provide a novel, wireless telephone assembly which, when collapsed, is of smoothly contoured configuration and of small, thin dimension, so as to be easily received within the pockets of the user's clothing or in article carrying apparel such as purses, handbags, to thus enable the telephone assembly to be easily carried about by the user.

The invention is the construction of a portable telephone made short enough and flat enough to be conveniently carried upon the person, yet allowing it to be quickly reconfigured into a form that is long enough and contoured enough to be effective and natural to use.

The various objects and features of the present invention are realized through the provision of a collapsible telephone assembly having a pair of relatively short and relatively thin and contoured chassis sections which are interconnected at respective ends thereof by a pivot or swivel connection having its plane of rotation being oriented in angular relation with each of the chassis sections. The contour of the chassis sections is so chosen as to determine the most suitable plane of rotation for maximum ergonomic appeal of the open chassis sections to the user. In the preferred embodiment, the chassis sections are interconnected by a simple snap-fit connection between a circular flange or connection prongs of one chassis section and a circular connection groove defined by an internal pivot hub of the opposite chassis section. This feature enables the chassis sections to be simply and efficiently interconnected simply by pressing them into assembly. Also, if desired, the snap fit connection may be disengaged for separation of the chassis sections through the use of a simple disengaging tool. Each of the chassis sections defines internal chambers for containing respective portions of the electronic circuitry of the portable telephone system. The engaging surfaces of the pivot connection defined by the interfitting chassis sections may be of any desirable configuration that permits relative rotation of the chassis sections at the pivot connection. For example, they may be planar as shown at 52 and 53 or they may be concave-convex, of tapered configuration or they may define steps or interengaging shoulders.

The pivot connection of the telephone assembly also includes a locking mechanism that is capable of locking the telephone chassis sections in the open and closed positions thereof and which is manually actuatable by the user when opening or closing of the telephone assembly is desired. The pivot connection also includes a torsion spring for urging the telephone chassis sections from the closed, compact position toward the open position so that upon being unlocked by the user, the torsion spring will induce relative rotation of the chassis sections at least partially toward the open position thereof. This feature enables the portable telephone to be quickly opened when its use is desired, and by similar but reverse torsion spring application, quickly closed when communication activity has been concluded.

One of the chassis sections incorporates a retractable antenna which is interconnected with the pivot assembly in such manner that the antenna is automatically extended when the telephone assembly is pivotally opened and is automatically retracted when the telephone assembly is pivotally moved toward its closed position. The pivot mechanism of the telephone assembly is also designed to permit the transition of electric wires that interconnect the electronic circuitry of the chassis sections through the pivot connection to accommodate pivotal movement of the chassis sections between the open and closed positions thereof.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments which become obvious upon an understanding of this invention.

In the drawings:

FIG. 1 is an elevational view of a portable telephone assembly constructed in accordance with the present invention and being pivotally opened and closed, and being shown in the open position thereof.

FIG. 2 is a side elevational view of the telephone assembly of FIG. 1, also being shown in the open or extended position thereof.

FIG. 3 is a side elevational view of the telephone assembly of FIGS. 1 and 2, being shown in the compact, closed position thereof.

FIG. 4 is a rear elevational view of the telephone assembly of FIGS. 1 and 2, being shown in the closed position thereof.

FIG. 5 is a sectional view taken along line 5—5 of FIG. 4. and showing the lock mechanism of the telephone chassis assembly in the locked position thereof.

FIG. 6 is a sectional view similar to that of FIG. 5 but showing the locking mechanism in the unlocked position thereof.

FIG. 7 is a partial sectional view taken along line 7—7 of FIG. 5.

FIG. 8 is a partial sectional view of the telephone assembly of this invention taken along line 8—8 of FIG. 7.

FIG. 9 is a partial sectional view of the pivot connection structure of the portable telephone assembly, showing rotational positioning of the chassis sections at the point of torsion spring relief as the chassis sections are rotated from the closed position toward the open position of the portable telephone assembly.

FIG. 10 is a partial sectional view of the portable telephone assembly similar to that of FIG. 9 and showing the pivot connection structure with the chassis sections disposed at the opened positions thereof, with the torsion spring set or energized.

FIG. 11 is a partial sectional view similar to that of FIGS. 9 and 10 and showing the telephone chassis sections being positioned between the opened and closed positions thereof, such as during closing movement at the point of torsion spring relief.

Figure 7:
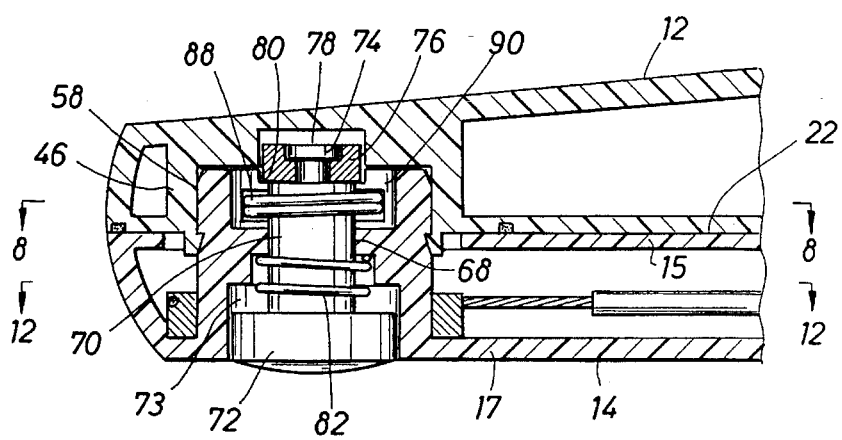
Figure 8:
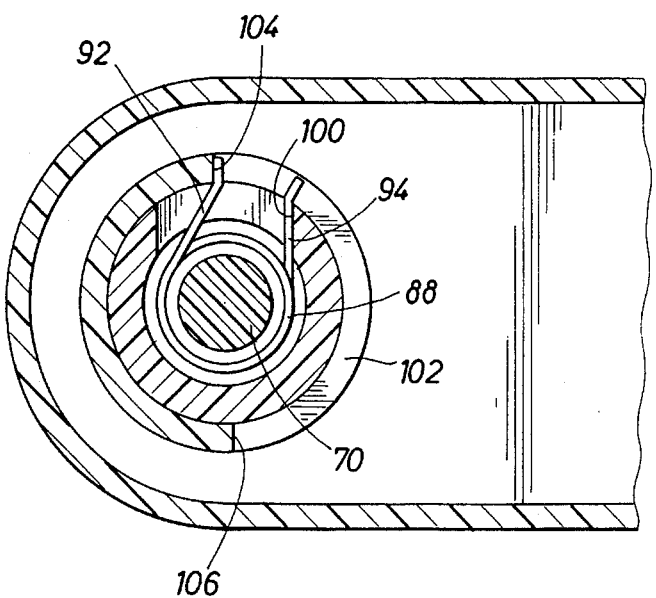
Figure 12:
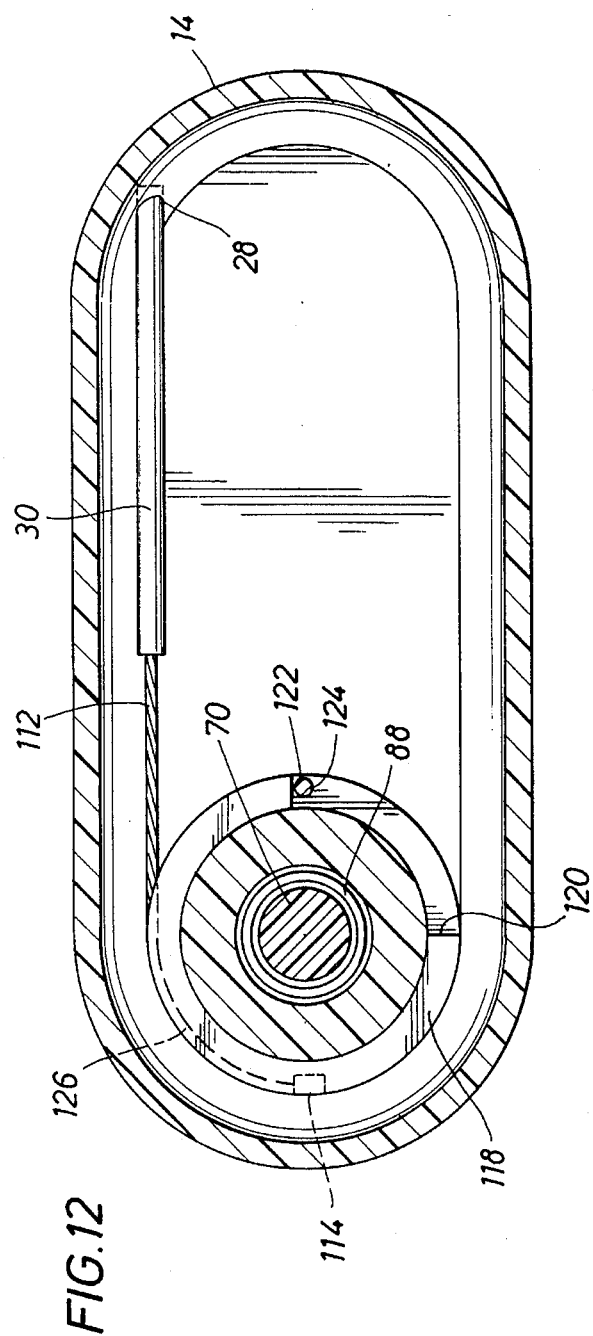

FIG. 12 is a sectional view taken along line 12—12 of FIG. 7 and showing the telephone chassis sections in the closed positions thereof and further showing the telephone antenna being at its retracted position.

Figure 13:
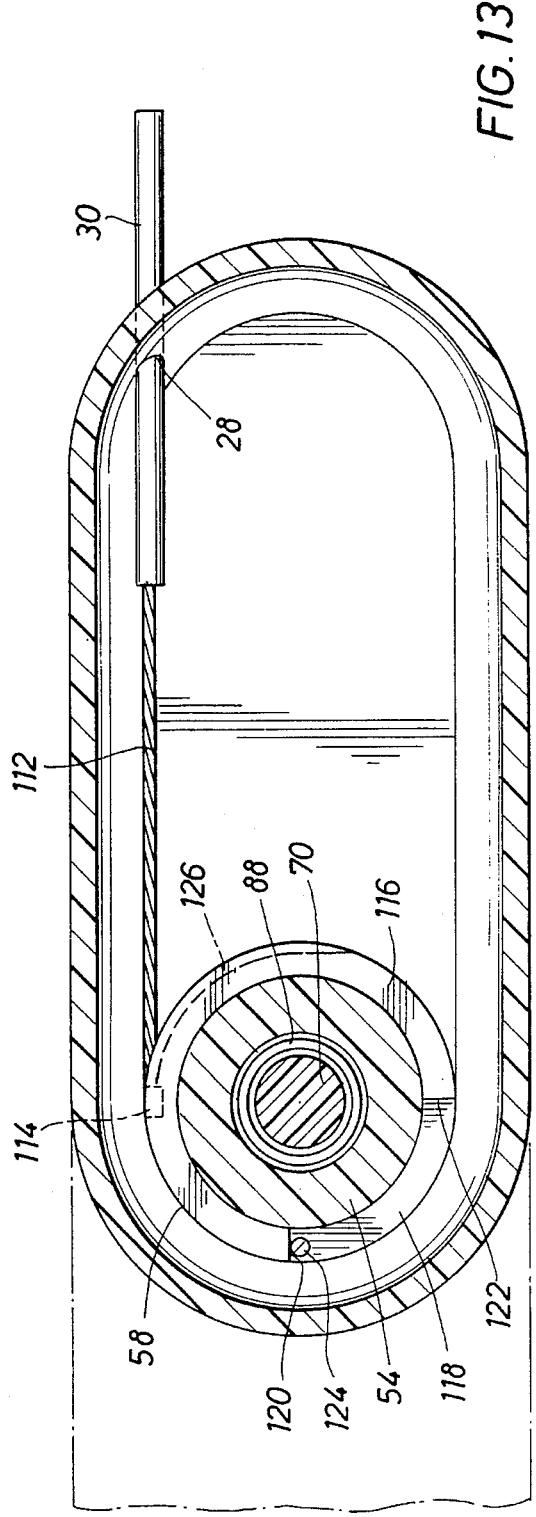

FIG. 13 is a partial sectional view of the portable telephone assembly similar to that of FIG. 12 with the telephone chassis sections being shown in the opened position thereof when the telephone antenna being extended.

DETAILED DESCRIPTION OF THE PREFERRED EMBODIMENT

Figure 1:
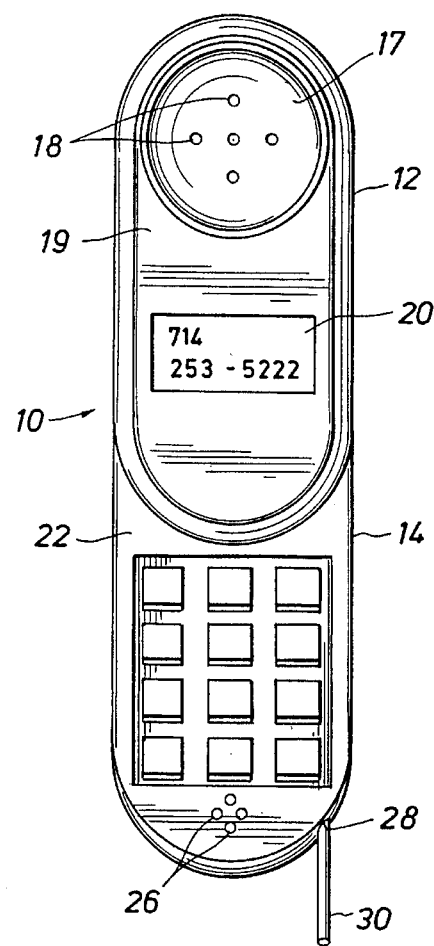
Figure 2:
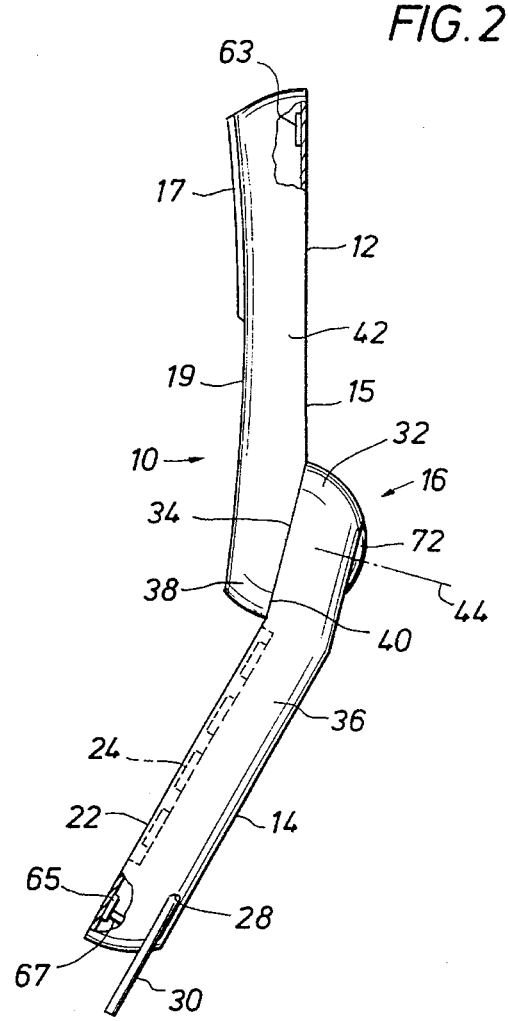

Referring now to the drawings and first to FIGS. 1 and 2, a portable telephone assembly being constructed in accordance with the present invention is shown generally at 10 and shows first and second chassis sections 12 and 14, which are pivotally interconnected by means of a pivot or swivel connection shown generally at 16. The first chassis section 12 defines a smoothly curved contoured surface 13 which is intended for orientation toward the face of the user and is provided with a speaker configuration 17 at the upper end thereof which defines a plurality of apertures 18 which conduct sound waves from an internal speaker, not shown, to the ear of the user. The first chassis section may further define an information panel 20 which may conveniently take the form of a liquid crystal display or any other suitable display such as for presentation of one or more telephone numbers, alpha-numeric messages, status information, etc.

The second chassis section 14, like the first chassis section 12 is of elongate, relatively thin configuration and defines a control panel or face surface 22 which is intended to be directed toward the face of the user when the telephone is in use. The surface 22 will be the mating surface in closure and act as a perimeter barrier for a telephone keypad 24 or other control panel components which will preferably be sealed with respect to the second chassis section 14 to prevent entry of dust and other debris therein. The first chassis section 12 defines a rear surface 15 which corresponds with the configuration of the chassis surface 22 and, in the closed positions of the chassis sections, is disposed in close fitting, covering relation with the surface of panel 22 of the second chassis section to minimize contamination of the key pad 24 by dust and other debris.

Figure 3:
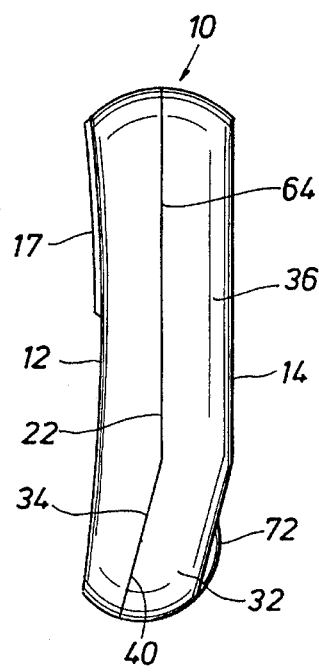

It is not necessary that the chassis sections be of substantially the same length or width as shown in FIG. 3 of the Drawings. If desired, one chassis section may be of significantly greater length or width than the other. In the closed condition of the portable telephone assembly surface 19 remains exterior to allow audio and visual monitoring of the functions the telephone might perform in its standby or alert mode. The second chassis section 14 also defines a plurality of microphone apertures 26 which provide for transmission of soundwaves from the user's mouth to a microphone, not shown, which is located within the second chassis section. The second chassis section also defines an antenna opening 28 through which an antenna 30 is extended and retracted as will be explained in detail hereinbelow.

It is desirable to interconnect the first and second chassis sections in pivotally interconnected manner and to provide for positioning of the chassis sections in an elongate and ergonomically configured relationship as shown in FIG. 2 when opened, and a small, compact closed position as shown in FIG. 3. Further, it is desirable to provide for efficient positioning of the telephone chassis sections in substantially sealed and closely juxtaposed relation as shown in FIG. 3 when the chassis sections are moved to the closed positions thereof. These features are realized through the provision in the second chassis section of an angulated end portion 32 which provides an angulated pivot surface 34 which establishes a plane of rotation which is oriented in angulated relation with the elongate major portion 36 of the second chassis section. Correspondingly, the first chassis section 12 is provided with an angulated end portion 38 having a pivot surface 40 which is disposed in angulated relation with an elongate major portion 42 of the first chassis section. The pivot surface 40 defines a plane of rotation which correspond to the plane of rotation of the angulated pivot surface 34. These angulated pivot surface relationships establish an axis of rotation 44 of the pivot connection 16 which is oriented in angular relation with both of the elongate sections 36 and 42 of the telephone chassis sections. This angulated axis of rotation, together with the respective angulated pivot surfaces 34 and 40 cooperatively permit orientation of the chassis sections in an ergonomic configuration as is evident from FIG. 2 when the telephone assembly is open. Surfaces 34 and 40 are depicted flat, but may be configured in various mating assemblies, including convex-concave, of tapered configuration, or be defined by steps or interengaging shoulders. Thus, the surfaces 34 and 40 are of corresponding configuration so that they are complimentary to one another to provide an interfitting relationship. This pivotal arrangement also permits the telephone assembly, when closed as shown in FIG. 3 a smoothly contoured configuration so that it can be efficiently received in the pockets of the user's clothing or in a purse or other carrying device without being of an awkward configuration for handling and transportation.

Referring now to FIGS. 5–11 hereof, the angulated pivot assembly 16 is shown in detail. The chassis section 12 defines a circular internal wall structure 46 which defines a connection flange 48 having a tapered internal pivot flange 50. Alternatively, the connection flange may provide a plurality of connection prongs of the cross-sectional configuration that is shown or of a suitable configuration for the establishment of a snap-fit connection. Also, if desired, the connection flange 50 or connection prongs may be releasable to permit the chassis sections to be separated for the purpose of servicing. The connection flange 50 is structurally supported by a substantially planar face wall 52 which defines the planar pivot surface 40. Correspondingly, the angulated end portion 32 of the second chassis section 14 defines a circular internal connection hub 54 having a tapered connection groove 56 formed externally thereof, which is adapted to receive the tapered internal pivot flange 50 when the chassis sections are brought into assembly. The flange structure 48–50 is preferably composed of slightly yieldable material such as polymer so that the tapered internal pivot flange 50 is received within the tapered external groove 56 by a snap fit. Thus, the chassis sections will be pivotally interconnected simply by pressing them together sufficiently that the tapered internal pivot flange or connection prongs, as the case may be, pass over the external cylindrical surface 58 of the hub structure 54 and snaps into the tapered groove 56.

Figure 4:
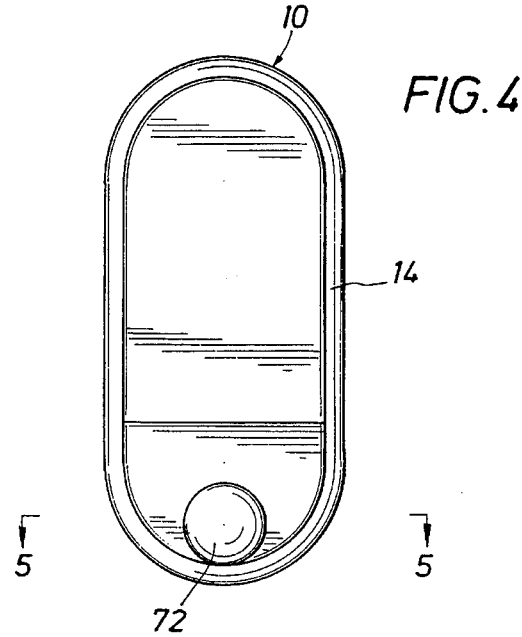

In the closed positions of the chassis sections it is desired that the keypad 24 and the microphone apertures 26 be protected against intrusion of dust and other debris as well as being protected from contact by external objects. It is also desirable that the circular angulated pivot connection 16 be protected from intrusion by dust and other debris. A dust seal 60 is located within a circular seal groove 62 and is positioned for sealing contact with the planar pivot surface 34. The dust seal 62 maintains its engagement with the surface 34 during relative rotation of the chassis sections and thus prevents intrusion of dust and other debris into the chassis at the pivot section. The first chassis section 12, as mentioned above, is provided with a rear closure surface 15 which, in the closed position of the telephone assembly, as shown in FIG. 3 is disposed in close juxtaposition with the face surface 22 of the chassis section 14. Thus, when the telephone assembly is closed, as shown in FIGS. 3 and 4, the keypad 24 cannot be contacted by foreign objects when the telephone is handled or when it is contained within a handbag, briefcase or other telephone transporting device. Although the surfaces 15 and 22 of the respective chassis sections are illustrated as being of planar configuration, such is not intended to limit the spirit and scope of the present invention. These surfaces need only to be of corresponding configuration so that a snug mating occurs upon closure. For example, the corresponding surfaces 15 and 22 may be of curved configuration if desired.

It may be desirable to provide for activation of the electronic circuitry of the telephone from a standby mode (on-hook) to an active mode (off-hook) upon pivotal opening of the chassis. This is accomplished by providing a magnet 63 in chassis section 12 and a magnetically operated microswitch 14 in the opposite chassis section 65. When the chassis is pivotally opened the microswitch is activated thus activating switch circuit 67.

Figure 5:
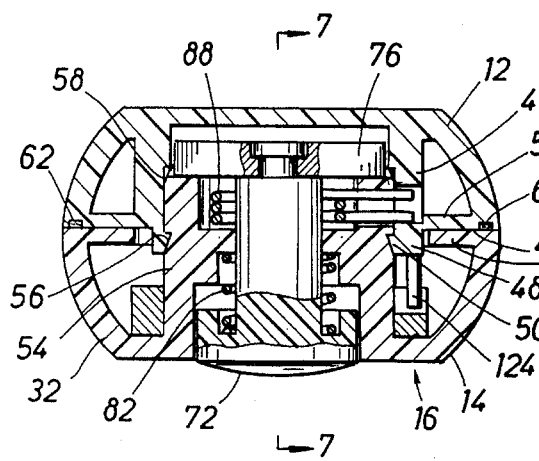
Figure 6:
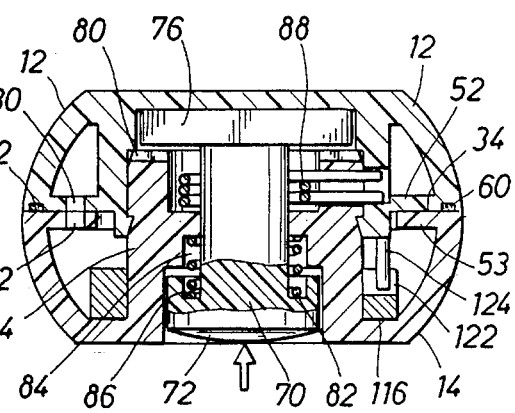

It is desirable that the telephone chassis sections 12 and 14 be immovable when fully extended as shown in FIGS. 1 and 2 and that inadvertent relative rotation thereof be prevented when the telephone assembly is closed, as shown in FIGS. 3 and 4. To provide these features, the telephone assembly is provided with a locking mechanism that enables the telephone chassis sections to be locked when both opened and closed as shown in FIGS. 5, 6 and 7. The internal pivot hub structure 54 provides an internal aperture 68 through which extends a lock shaft 70 having an actuating button or head 72 at one end thereof. At its opposite end, the lock shaft 70 is provided with a connecting head 74 which provides support for an elongate lock member 76. The lock member is received within an elongate lock receptacle 78 which is of sufficient dimension to permit linearly movement of the lock 76 to its unlocked position. At its free end, the hub 54 defines a transfer locking slot 80 which receives the elongate lock member 76 to provide for locking of the chassis sections to prevent relative rotation thereof. The lock release actuator button or head 72, together with the lock shaft 70 and the lock member 76 are urged toward the locked position thereof by a compression spring 82 having one end thereof received within a spring receptacle 84 defined within the hub 54 while the opposite end of the compression spring 82 is received within a spring recess 86 that is defined by the lock release actuator head 72. For unlocking of the lock mechanism the lock release actuator 72 is moved linearly by manual actuation as shown in FIG. 6 thereby overcoming the force of the compression spring 82 and moving the locking bar 76 to a position disengaging it from the locking groove 80. When this is done, the chassis sections 12 and 14 may be relatively rotated between the opened and closed positions thereof. The lock mechanism will function, both when the chassis sections are at their closed positions, as shown in FIGS. 3 and 4, and when they are opened, as shown in FIGS. 1 and 2, for the reason that the chassis sections are pivoted between the opened and closed positions. Thus, when the chassis sections are closed, the locking bar member 76 is oriented with respect to the locking groove 80 and when the chassis sections are opened, the lock member 76 is also oriented with respect to the locking slot 80.

Figure 9:
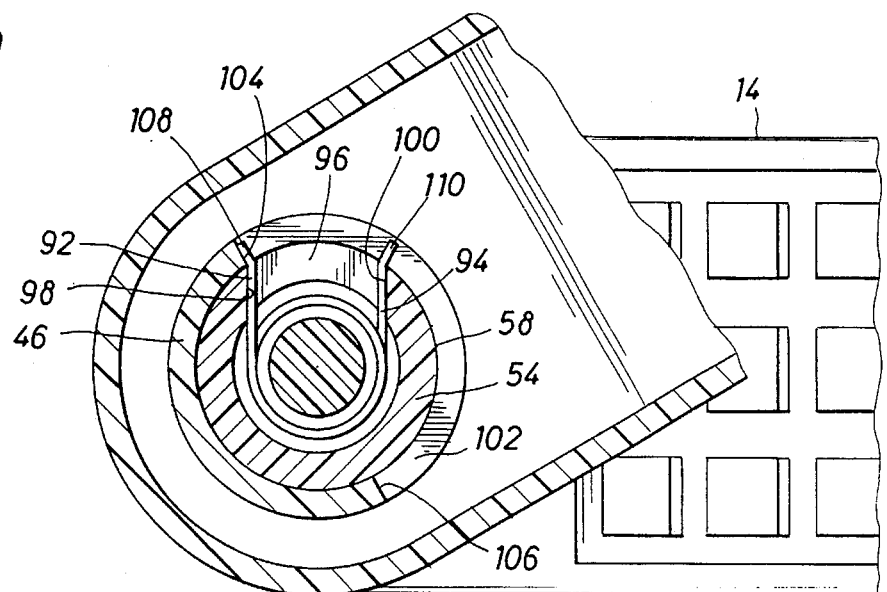
Figure 10:
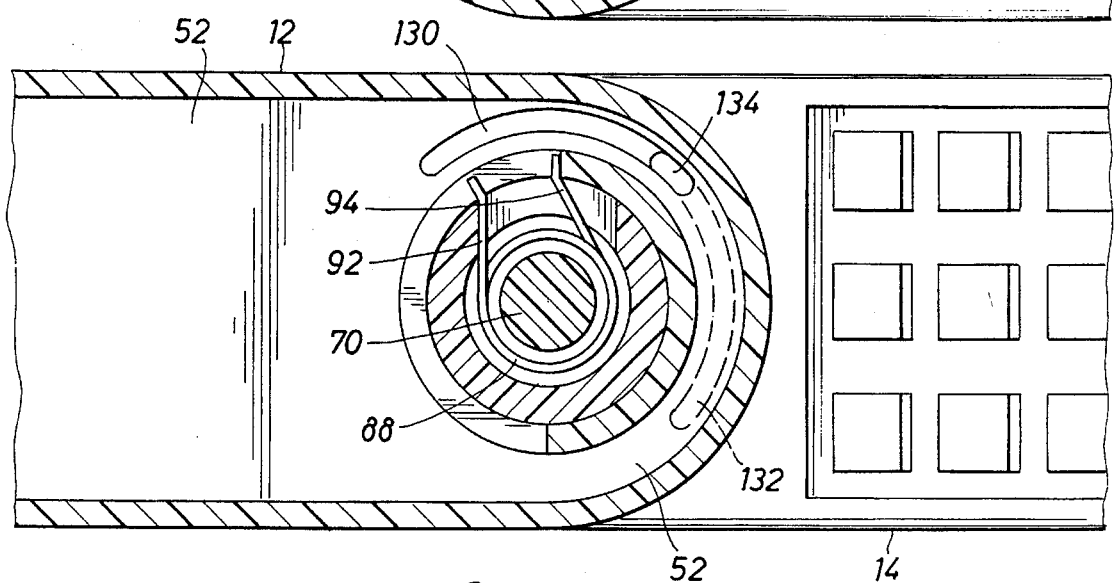
Figure 11:
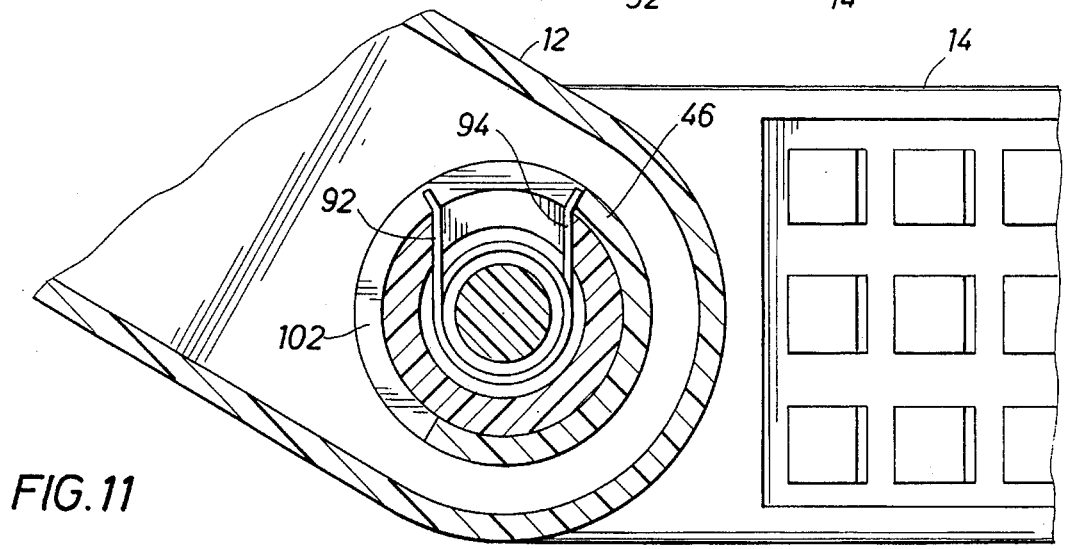

It is desirable upon unlocking of the chassis sections from the closed positions thereof that they automatically move, at least partially, toward the opened position shown in FIGS. 1 and 2. This feature is accomplished by the provision of a torsion spring 88 which is positioned about the lock shaft 70 and is received within a torsion spring receptacle 90 defined centrally of the hub member 54. The torsion spring defines spring end elements 92 and 94 which are received within a spring slot 96 of the hub member 54 which defines opposed spring end engagement surfaces 98 and 100. The circular internal wall 46 of the chassis section 12 defines a rather wide torsion spring slot 102 which defines spring engaging surfaces 104 and 106 which are disposed for engagement with respective angulated terminal portions 108 and 110 of the torsion spring ends. Thus, the circular wall 46 of the chassis section 12 and the hub 54 can rotate freely relative to one another within the limits defined by the arcuate length of the slot 102 which is defined by positioning of the spring engaging surfaces 104 and 106. In the closed position of the telephone assembly as shown in FIGS. 3, 4, 6, and 8, the spring engaging surfaces 100 and 104 will be positioned so that the respective spring ends 92 and 94 are forced toward one another, thereby providing the torsion spring 88 with torsion force which urges the chassis sections toward the opened position thereof. As soon as the lock release actuator head 72 is moved to the unlocked position, as shown in FIG. 6, the torsion spring force applied by the spring 88 against the surfaces 100 and 104 of the hub 54 and wall 46 will cause the chassis sections to pivot immediately to the position shown in FIG. 9. At this position, the force being applied by the torsion spring will dissipate because the spring ends will be positioned at the relaxed positions thereof. The length of the slot 102 defined by the wall 106 then permits free rotation of the chassis section 12 in a counterclockwise direction as shown in FIG. 9 until such time as the surface 106 moves into engagement with the angulated spring end 110. Thereafter, continued rotation of the chassis section 12 relative to the chassis section 14 will cause the torsion spring ends to be urged toward one another as shown in FIG. 10. Maximum spring force of the torsion spring 88 is achieved when the chassis section 12 has been rotated to the fully open position relative to the chassis section 14 as shown in FIG. 10. At this position, since the lock recess 78 will have become registered with the elongate lock member 76, the compression spring 82 will shift the lock shaft 70 inwardly, as shown in FIG. 7, thus engaging the lock within the locking slot 80 and moving the actuating button or head 72 outwardly with respect to its recess 73 in the chassis section 14. Thus, it is seen that the chassis sections, when unlocked from the closed positions thereof are rotated by the force of the torsion spring to a partially opened position as shown in FIG. 9. When thus partially opened, the chassis sections are freely pivotal, until the position shown in FIG. 11, where further rotation of the chassis sections toward the fully opened position achieves energization of the torsion spring by moving the spring ends 92 and 94 toward one another as shown in FIG. 10. In this position, the locking mechanism is again aligned so that the compression spring 82 urges the lock shaft 70 to its locked position and positions the lock member 76 within the locking slot 80. Since the torsion spring 88 will be loaded or energized in the fully opened position of the chassis sections as shown in FIG. 10., manual movement of the lock release actuator 72 and lock shaft 70 to the unlocked position thereof as shown in FIG. 6 will permit torsion spring energized movement of the chassis sections toward the closed positions thereof as shown in FIG. 11. This torsion spring closing movement will continue until a partially angulated position has been established as shown in FIG. 11, at which point the spring force of the torsion spring will be dissipated. The length of the slot 102 of the wall 46 will then permit free manual rotation of the chassis sections from the partially closed position of FIG. 11 to the fully closed position of FIG. 8. Friction of the connecting surfaces caused by the snug pressed fitting and dust ring will maintain ample resistance in transition movement to keep the chassis sections from "flapping". If desired, any other mechanism may be employed to provide the pivot connection with resistance to freely allow pivoting but provide resistance in manual rotation.

In an alternative embodiment of the present invention, as shown in FIGS. 12 and 13, the portable telephone mechanism may be provided with a retractable antenna, which will be extended and retracted upon opening and closing movement of the chassis sections. The antenna 30 is provided with a flexible antenna drive cable 112 which is secured by a cable connection member 114 to a circular antenna drive member 116 which is positioned for relative rotation about the cylindrical surface 58 of the hub structure 54. The antenna drive member 116 defines an arcuate slot 118 having end surfaces 120 and 122 which are oriented for engagement by an antenna drive pin 124 which extends from the circular wall structure 46 of the chassis section 12 as shown in FIGS. 5 and 6. As the chassis sections 12 and 14 are rotated toward the opened position thereof, the drive pin 124, after having been moved through a predetermined arcuate distance, as defined by the length of the arcuate slot 118 engages the antenna drive surface 120 and thereby rotates the antenna drive member 116 clockwise to thus apply antenna extending force to the cable 112 for extension of the antenna 30 through its opening 28 in the chassis section 14. During closing movement of the chassis sections position shown in FIG. 13, after releasing the lock mechanism, the torsion spring will rotate the chassis sections essentially to the position shown in FIG. 11 at which point the torsion spring force is dissipated. During this rotation, the antenna drive pin 124 is rotated through the length of the arcuate slot 118. After sufficient relative rotation of the chassis sections has occurred, the antenna drive pin will move into contact with the drive surface 122 with the antenna drive member 116. At this point, the antenna drive member will be rotated counterclockwise about the hub structure 54 thereby moving the antenna cable 112 and the antenna 30 toward the retracted position thereof which is shown in FIG. 12. During this antenna retracting movement, the cable 112 is received within an external cable groove 126 of the antenna drive member 116. Thus, it is seen that as the chassis sections are moved to the opened positions thereof, the antenna 30 is automatically extended from the position shown in FIG. 12 to the position shown in FIG. 13. Conversely, upon rotational movement of the chassis sections from the position shown in FIG. 13, to the closed position shown in FIG. 12, the antenna is retracted so that only its tip end protrudes from the antenna opening 28 of the chassis section 14.

It is seen that the arcuate length of the antenna ring slot 118 controls the length of antenna extension and retraction that occurs upon opening and closing movement of the chassis sections. Thus, by controlling the length of the arcuate slot 118, the antenna can be driven linearly to an extent determined by the precise radio frequency of the device, or to meet other signal sending and receiving requirements. After the antenna has been automatically extended to the position shown in FIG. 13, the elongate arcuate recess 118 permits it to be manually retracted simply by applying sufficient retraction force to the antenna to rotate the drive ring 118.

The chassis sections each define internal compartments within which is located the electronic circuitry, not shown, of the portable telephone. Since portions of this electronic circuitry are contained in either or both of the respective chassis sections, it will be necessary to provide for conductor wires of the electronic circuitry to extend between the relatively movable chassis sections. To accommodate this feature each of the chassis sections are provided with arcuate slots 130 and 132 of the respective wall structures 52 and 53 of the pivot sections. These arcuate slots, in the fully extended positions of the telephone chassis sections as shown in FIG. 10 define an opening 134 of minimal dimension. This opening increases in dimension to the full length of the arcuate slots 130 and 132 when the telephone chassis sections have been moved to the fully closed positions thereof.

Since certain changes or modifications may be made in the disclosed embodiments without departing from the inventive concepts involved, it is the aim of the appended claims to cover all such changes and modifications falling within the true spirit and scope of the present invention.

What is claimed is:

1. A portable telephone having a chassis comprising:

(a) a first chassis section defining a rear closure surface;

(b) a second chassis section defining a mating face surface having face-to-face movable relation with said rear closure surface;

(c) said first chassis section having a circular pivot flange projecting axially beyond said rear closure surface and defining an axis for relative pivotal rotation of said first and second chassis sections between a closed position where said rear closure surface and said mating face surface are disposed in intimate juxtaposition defining a compact substantially pocket-sized chassis configuration and being rotatably movable to an open position where said first and second chassis sections are oriented to positions defining an ergonomic telephone configuration for telephone communication, said circular pivot defining a tapered internal pivot flange;

(d) a generally cylindrical connection hub being defined by said second chassis section and having a circular pivot connection groove located externally thereof, said circular tapered internal pivot flange being engaged within said circular pivot connection groove and defining a rotatable connection between said circular pivot flange and said generally cylindrical connection hub;

(e) said circular pivot flange being flexible to permit movement of said circular pivot flange over said generally cylindrical connection hub during assembly of said first and second chassis sections and after assembly retaining said circular pivot flange and said generally cylindrical connection hub in rotational assembly and against relative axial movement.

2. The portable telephone of claim 1, further comprising:

(a) said first and second chassis sections each defining arcuate conductor wire passage slots cooperatively defining a conductor wire passage at all relative positions of said first and second chassis sections, an electronic circuitry being located within said first and second chassis sections and having conductor wires extending through said conductor wire passage;

(b) a speaker being located within one of said chassis sections and being coupled with said electronic circuitry;

(c) a microphone being located within the other of said chassis sections and being coupled with said electronic circuitry;

(d) control panel components being located within one of said first and second chassis sections;

(e) a micro switch being located in one of said first and second chassis sections for controlling energization of said electronic circuitry; and (f) a switch actuator being located within the other of said first and second chassis sections and moving said telephone control switch for energization of said electronic circuitry upon rotational movement of said first and second chassis sections from said open and closed position.

3. The portable telephone of claim 1, wherein:

(a) said first and second chassis sections having said annular connecting flange and said connection hub at respective end portions thereof; and (b) said respective end portions of said first and second chassis sections defining a plane of rotation oriented at an oblique angle with respect to both of said first and second chassis sections.

4. The portable telephone of claim 1, wherein:

(a) said rear closure surface and said mating face surface of said first and second chassis sections each defining surfaces of corresponding configuration which, in the closed position of said chassis sections are positioned in face to face juxtaposed relation, said first and second chassis sections each further defining a mating rotational surface being angulated with respect to the respective chassis section and being in juxtaposed face to face relation and defining a plane of rotation being angulated with respect to both of said first and second chassis sections; and (b) said rotatable connection defining an axis of rotation oriented in perpendicular relation with said plane of rotation and in angular relation with said rear closure surface and said mating face surface of said first and second chassis sections.

5. The portable telephone of claim 1, wherein:

said first chassis section having the rear closure surface of a configuration corresponding to said second chassis section mating face surface, in said closed position said rear closure surface being disposed in face to face juxtaposition with said of said mating face surface of said second chassis section.

6. The portable telephone of claim 1, including:

means for locking said chassis sections at said open and closed positions thereof.

7. The portable telephone of claim 6, wherein said means for locking comprises:

(a) said second chassis section defining an internal locking receptacle; and (b) a lock element being axially movable within said rotatable connection between locked and unlocked positions relative to said first and second chassis sections and having a lock member thereon being positionable within said locking receptacle at said locked position and positionable out of said locking receptacle at said unlocked position.

8. The portable telephone of claim 7, wherein said means for locking further comprises:

(a) a spring member having a spring force urging said lock element toward said locked position; and (b) said lock element having a lock release actuator member exposed externally of one of said first and second chassis sections and being manually movable to said unlocked position against said spring force.

9. The portable telephone of claim 1, wherein:

(a) said circular pivot connection groove being of tapered cross sectional configuration; and (b) said circular pivot flange having a tapered portion being receivable for rotation within said tapered circular pivot connection groove.

10. The portable telephone of claim 1, wherein:

(a) said first chassis section defining a first locking receptacle;

(b) said connection hub defining a second locking receptacle for registry with said first locking receptacle and defining a central lock shaft opening;

(c) a lock shaft extending through said central lock shaft opening and having a lock member thereon for engagement within said first and second locking receptacles for locking said first and second chassis sections in substantially rotatably immovable relation only at said open and closed positions;

(d) a compression spring located about said lock shaft and having a spring force urging said lock shaft axially in a direction for positioning said lock member in locking engagement within said second locking receptacle; and (e) a lock release member on said lock shaft and being exposed externally of said second chassis section for manual movement of said lock shaft and lock member against said spring force for movement of said lock member out of said second locking receptacle thus releasing said first and second chassis sections for relative rotation between said open and closed positions.

11. The portable telephone of claim 1, further comprising:
a torsion spring being located about said lock shaft and applying a spring force to said first and second chassis sections at said open and closed positions and urging said first and second chassis sections rotatably in a direction away from said open and closed positions.

12. The portable telephone of claim 1, wherein said rotatable connection further comprises:
(a) said rotatable connection hub defining an arcuate recess having spring engaging surfaces at each end thereof;
(b) said circular flange defining a second arcuate recess having spring engaging surfaces at respective ends thereof;
(c) a torsion spring having a portion thereof encircling a lock shaft and having spring ends received within first and second arcuate recesses, said spring ends being forced toward one another by respective spring engaging surfaces of said connection hub and circular flange thus energizing said torsion spring during predetermined rotatable movement of said first and second chassis sections near said open and closed positions and permitting relaxation of said torsion spring during an intermediate portion of said predetermined rotatable movement of said first and second chassis sections; and
(d) means limiting rotational movement of said first and second chassis sections to less than 2700°.

13. The portable telephone of claim 12, wherein:
(a) said connection hub defining a locking receptacle;
(b) said lock shaft extending axially through said connection hub and having a lock member thereon disposed for positioning within said locking receptacle for locking said first and second chassis sections in immovable relation, said locking receptacle and lock member being disposed in locking registry at both said open and closed positions.

14. The portable telephone of claim 13, further including:
(a) said lock shaft being axially movable within said connection hub; and
(b) a compression spring urging said lock shaft and locking member in a direction for movement of said locking member into said locking receptacle.

15. The portable telephone of claim 1, including:
(a) an antenna being in linearly movable assembly within one of said first and second chassis sections and being extendable and retractable relative thereto; and
(b) an antenna drive mechanism being located within one of said first and second chassis sections and being movable responsive to planar rotatable opening and closing movement of said first and second chassis sections for imparting linear extension of said antenna upon pivotal opening movement of said chassis sections and linear retraction of said antenna upon pivotal closing movement of said chassis sections.

16. The portable telephone of claim 15, wherein said antenna drive mechanism comprises:
(a) a flexible drive cable being connected to said antenna;
(b) an antenna drive ring being positioned for retraction within one of said first and second chassis sections and establishing a drive connection with said flexible drive cable, said antenna drive ring defining an arcuate drive slot having antenna drive surfaces at respective ends thereof; and
(c) a drive member extending from the other of said first and second chassis sections and being disposed for driving engagement with respective drive surfaces of said antenna drive ring during predetermined rotational movement of said first and second chassis sections.

17. A portable telephone of being closed to define a small compact configuration for storage and transportation and being opened to define an elongate telephone of ergonomic configuration substantially corresponding to the facial anatomy of a user, said portable telephone comprising:
(a) a first chassis section having a rear closure surface and defining a substantially planar rotatable surface at one end thereof and defining a pivot connection receptacle therein;
(b) a second chassis section having a panel defining a face surface of corresponding configuration with said rear closure surface; both said first and second chassis sections further defining an angulated pivot surface establishing a plane of rotation between said first and second chassis sections and said pivot surface is oriented in oblique angular relation with said chassis sections
(c) an annular flexible pivot connecting flange being defined by said first chassis section and being located about and concentrically with said pivot connection receptacle; and
(d) a generally cylindrical connection hub being defined by said second chassis section and being rotatably received within said connection receptacle and within said annular connecting flange, said connection hub defining an external pivot connection groove receiving said flexible pivot connecting flange in rotatable relation therein, said flexible pivot connecting flange being received over said generally cylindrical connection hub during assembly of said chassis sections and entering said external pivot connection groove upon registry therewith to establish relatively rotatable relation between said flexible pivot connecting flange and said generally cylindrical connection hub and to restrain relative axial movement of said annular flexible pivot connection flange and said generally cylindrical connection hub, said annular flexible pivot connecting flange, connection receptacle and connection hub defining a rotatable connection rotatably interconnecting respective end portions of said first and second chassis sections and defining a pivot axis about which said first and second chassis sections rotate, said respective end portions of said first and second chassis sections cooperatively defining a plane of rotation about said pivot axis to provide the opened chassis sections with the ergonomic configuration generally corresponding to the facial anatomy of the user.

18. The portable telephone of claim 17 wherein said rotatable connection further comprises:
locking means for releasably locking said first and second chassis sections in non-rotatable relation at said open and closed positions thereof.

19. The portable telephone of claim 18, wherein said locking means comprises:
(a) said generally cylindrical connection hub having a locking receptacle therein; and
(b) an axially movable lock element being receivable in locking engagement within said locking receptacle to lock said first and second chassis sections in non-rotatable relation only at said open and closed positions of said chassis sections, said axially movable lock element having an actuating member exposed externally and being manually movable for moving said lock element from said locking engagement within said locking receptacle to a lock release position permitting relative rotation of said first and second chassis sections.

20. The portable telephone of claim 19, further including:

a spring imparting linear force to said lock element and urging said lock element toward said locking engagement within said locking receptacle.

21. The portable telephone of claim 19, further including:

a spring imparting rotary force to said chassis sections at said open and closed positions thereof and, upon unlocking of said lock element, inducing initial relative rotation of said first and second chassis sections toward the opposite open or closed positions thereof.

* * * * *